(12) United States Patent
Vap

(10) Patent No.: US 9,370,167 B2
(45) Date of Patent: Jun. 21, 2016

(54) PET TOY WITH SQUEAKER MECHANISM

(71) Applicant: OTOMIK PRODUCTS, INC., Cincinnati, OH (US)

(72) Inventor: Jason P. Vap, Cincinnati, OH (US)

(73) Assignee: Otomik Products, Inc., Cincinnati, OH (US)

( * ) Notice: Subject to any disclaimer, the term of this patent is extended or adjusted under 35 U.S.C. 154(b) by 84 days.

(21) Appl. No.: 13/654,897

(22) Filed: Oct. 18, 2012

(65) Prior Publication Data

US 2014/0109841 A1    Apr. 24, 2014

(51) Int. Cl.
    *A01K 15/02*    (2006.01)

(52) U.S. Cl.
    CPC ..................... *A01K 15/025* (2013.01)

(58) Field of Classification Search
    CPC ........................... A01K 15/025; A01K 15/026
    USPC ................... 119/702, 707, 709–711
    See application file for complete search history.

(56) References Cited

U.S. PATENT DOCUMENTS

| | | | |
|---|---|---|---|
| 620,087 A | 2/1899 | Stein | |
| 700,850 A | 5/1902 | Stone et al. | |
| 1,193,992 A | 8/1916 | Cigol | |
| 1,515,786 A | 11/1924 | Munro | |
| 1,595,441 A | 8/1926 | Zenger | |
| 1,628,717 A | 5/1927 | Flowers | |
| 2,317,255 A | 4/1943 | Crowell | |
| 2,616,217 A | 11/1952 | Wild | |
| 2,653,411 A | 9/1953 | Beltz | |
| 2,712,201 A | 7/1955 | Wintriss | |
| 2,763,960 A | 9/1956 | Wintriss | |
| 2,817,116 A | 12/1957 | Miller et al. | |
| 2,928,208 A | 3/1960 | Wintriss | |
| 7,066,779 B2 | 6/2006 | Willinger | |
| 7,736,212 B2 | 6/2010 | Willinger | |
| 7,736,213 B2 | 6/2010 | Willinger et al. | |
| 2011/0005468 A1* | 1/2011 | Piety et al. ..................... | 119/707 |
| 2011/0061604 A1* | 3/2011 | Hill ................................. | 119/707 |
| 2011/0214617 A1* | 9/2011 | Markham ....................... | 119/707 |
| 2012/0103274 A1 | 5/2012 | Curry et al. | |
| 2012/0111283 A1* | 5/2012 | Hansen ......................... | 119/707 |
| 2012/0137986 A1* | 6/2012 | Shatoff et al. .................. | 119/707 |
| 2012/0192807 A1* | 8/2012 | Rutherford et al. ............ | 119/707 |
| 2012/0204809 A1* | 8/2012 | Axelrod et al. ................ | 119/709 |

* cited by examiner

*Primary Examiner* — David Parsley
*Assistant Examiner* — Morgan T Barlow
(74) *Attorney, Agent, or Firm* — Brake Hughes Bellermann LLP

(57) ABSTRACT

In one embodiment, an animal toy includes a body member and a squeaker member. The body member defines a cavity and includes a sidewall. The sidewall defines an opening in fluid communication with the cavity. The sidewall has a channel. The squeaker member defines a lumen and is configured to produce a sound in response to air passing through the lumen. The squeaker member has an extension portion. The squeaker member is coupled to the body member such that the extension member is disposed within the channel of the sidewall and at least a portion of the squeaker member is disposed within the cavity defined by the body member.

27 Claims, 10 Drawing Sheets

PET TOY WITH SQUEAKER MECHANISM

TECHNICAL FIELD

This disclosure relates generally to toys, such as pet toys, that include noise generating devices, such as squeaker mechanisms.

BACKGROUND

Some known toys, such as pet toys, include noise generating devices. In some of such toys the noise generating device is activated (to produce the noise) when the animal compresses the toy, such as by biting down on the toy.

In some known pet toys, the noise generating devices may become separated from the body of the pet toy. For example, during use (such as an animal playing with the toy), the noise generating device may be removed from the body of the toy. The separation of the noise generating device may destroy the functionality of the toy and may also be hazardous to the animal using the toy.

Additionally, known pet toys do not provide an owner of the pet the ability to turn off the noise generating device. In other words, in such known pet toys the noise generating always produces noise when the animal activates the noise generating device (such as by biting the toy to compress the body portion of the toy). The noise generated by the toy may at times be distracting or annoying to the owner of the pet and the owner may wish to limit the sounds or noises produced by the toy.

Accordingly, there is a need for a pet toy that includes a noise generating device that is securely coupled to the body portion of the toy to reduce the possibility that the noise generating device becomes separated from the body of the toy. Also, there is a need for a pet toy that allows the pet to enjoy the toy with the toy in a mode or configuration that does not produce any noise or sound.

SUMMARY

In one embodiment, an animal toy includes a body member and a squeaker member. The body member defines a cavity and includes a sidewall. The sidewall defines an opening in fluid communication with the cavity. The sidewall has a channel. The squeaker member defines a lumen and is configured to produce a sound in response to air passing through the lumen. The squeaker member has an extension portion. The squeaker member is coupled to the body member such that the extension member is disposed within the channel of the sidewall and at least a portion of the squeaker member is disposed within the cavity defined by the body member.

In another embodiment, an animal toy includes a body member and a squeaker member. The body member defines a cavity and includes a sidewall. The sidewall defines a first opening in fluid communication with the cavity. The sidewall defines a second opening in fluid communication with the cavity. The first opening is different than the second opening. The squeaker member defines a lumen and is configured to produce a sound in response to air passing through the lumen. The squeaker member is coupled to the body member such that at least a portion of the squeaker member is disposed within the cavity defined by the body member. The squeaker member includes a switch configured to be moved from a first position to a second position. The switch is configured to prevent passing of air through the lumen when the switch is in its first position.

In yet another embodiment, an animal toy includes a body member and a squeaker member. The body member defines a cavity and includes a sidewall. The sidewall defines a first opening in fluid communication with the cavity. The sidewall has a first portion and a second portion. The first portion of the sidewall has a first thickness. The second portion of the sidewall has a second thickness. The first thickness being greater than the second thickness. The squeaker member defines a lumen and is configured to produce a sound in response to air passing through the lumen. The squeaker member is coupled to the body member such that at least a portion of the squeaker member is disposed within the cavity defined by the body member. The squeaker member includes a switch configured to be moved from a first position to a second position. The switch is configured to prevent passing of air through the lumen when the switch is in its first position.

The details of one or more implementations are set forth in the accompanying drawings and the description below. Other features will be apparent from the description and drawings, and from the claims.

DETAILED DESCRIPTION

The devices and methods described herein are generally directed to devices such as toys that are configured to produce sounds or noises when they are manipulated. For example, in some embodiments, the devices are animal toys such as dog toys and are configured to be played with or otherwise manipulated by a dog. In other embodiments, the devices are toys that are configured to be played with or manipulated by a different type of animal. In yet further embodiments, the devices may be configured to produce sounds or noises when they are manipulated by a human.

Figure 1:
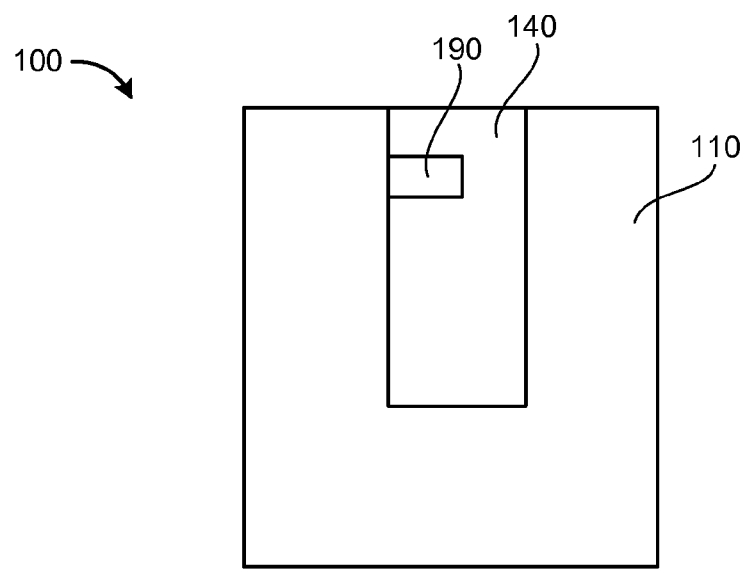
FIG. 1 is a schematic illustration of an apparatus according to an embodiment of the invention.
Figure 2:
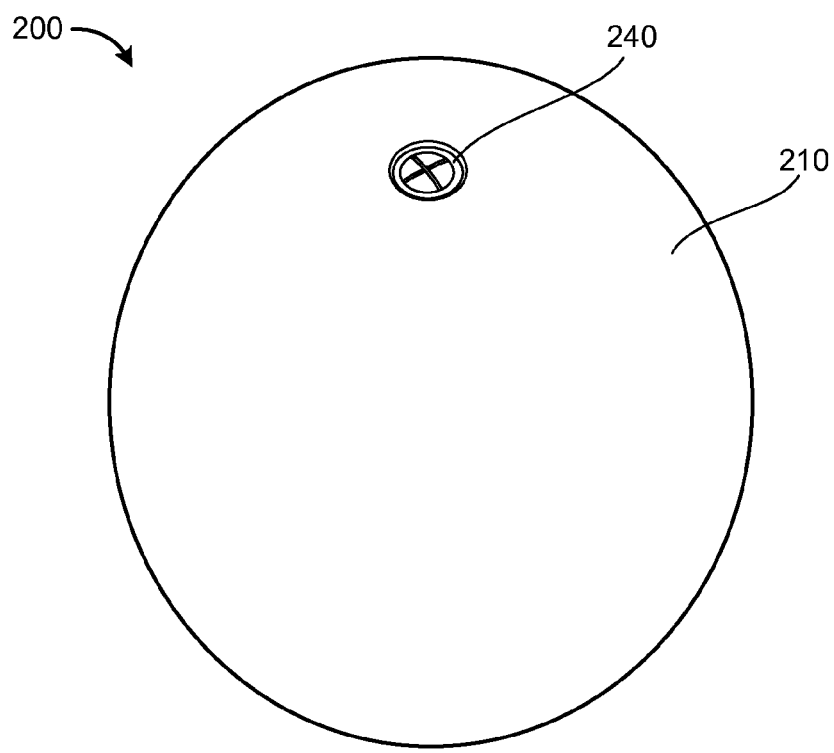
FIG. 2 is a perspective view of an apparatus according to an embodiment of the invention.
Figure 3:
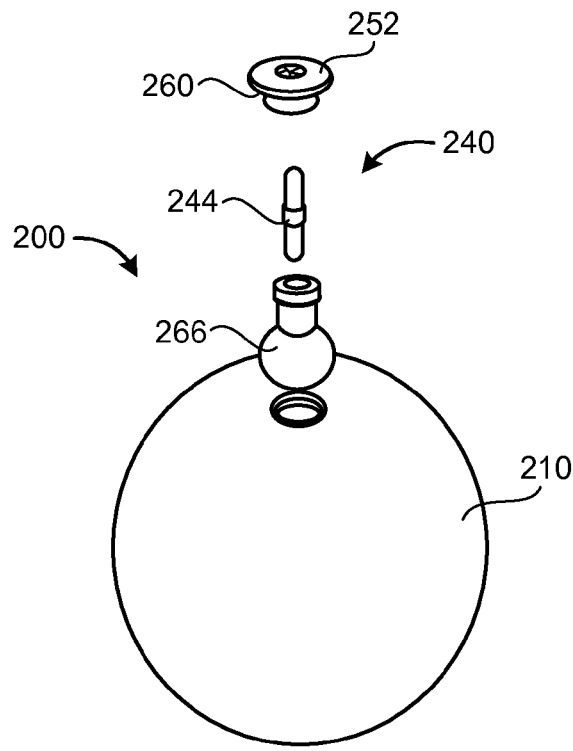
FIG. 3 is an exploded view of the apparatus of FIG. 2.

FIG. 1 is a schematic illustration of a device 100 in accordance with an embodiment of the invention. The device 100 includes a body member 110 and a noise producing member or squeaker member 140.

The body member 110 may be of any shape or size. For example, in some embodiments, the body member 110 is in the form of a sphere or ball. In other embodiments, the body member 110 has a different shape, such as a cube or other shape. In yet other embodiments, the body member 110 has the form of a figure such as a character or an animal.

In some embodiments, the body member 110 has a sidewall that defines a cavity. In some embodiments, the sidewall also defines an opening that is in fluid communication with the cavity. The body member 110 may be formed of a flexible or compressible material. Accordingly, the body member 110 may flex or compress when a force is placed on the body member 110. In such embodiments, the body member 110 may be squeezed or chewed on to compress or collapse the body member 110. As the body member 110 compresses or collapses, the cavity defined by the body member 110 will become smaller in volume and the some of the air that was previously disposed within the cavity will be forced out of the opening defined by the sidewall of the body member.

In some embodiments, the body member 110 is formed of a material that will return to its original shape or form once the squeezing or compression force is removed from the body member 110. In such embodiments, air will return to the cavity via the opening defined by the sidewall of the body member 110 and the cavity defined by the body member 110 will return to its original size (volume).

The squeaker member 140 is coupled to the body member 110. The squeaker member 140 is a noise generating device. In some embodiments, the squeaker member 140 is a noise generating device that is configured to generate sounds or noise when air passes by or through the squeaker member 140. For example, in some embodiments, the squeaker member 140 defines a lumen that extends from one end portion of the squeaker member 140 to another end portion of the squeaker member 140. In some such embodiments, the squeaker member 140 is configured to produce sounds or noises when air passes through the lumen defined by the squeaker member 140. Specifically, in some embodiments, the squeaker member 140 includes a reed or other sound producing member disposed within the lumen defined by the squeaker member 140. The reed or other sound producing member will make or generate noise or sounds when air passes through the lumen and by the reed or other sound producing member.

In some embodiments, the squeaker member 140 is coupled to the body member 110 such that a portion of the squeaker member 140 is disposed within the opening defined by the sidewall of the body member. In such embodiments, as the body member 110 is compressed or squeezed and air passes through the opening defined by the sidewall of the body member, the air will also pass by or through the lumen defined by the squeaker member 140 causing the squeaker member 140 to produce a noise or sound.

In some embodiments, the squeaker member 140 is coupled to the body member such that a portion of the squeaker member 140 is disposed within a cavity defined by the body member 110. In some embodiments, the portion of the squeaker member 140 that is disposed within the cavity defined by the body member 110 includes an extension portion that is larger is size than the opening defined by the sidewall of the body member 110.

In some embodiments, the squeaker member 140 is coupled to the body member 110 such that no portion of the squeaker member 140 is disposed outside of the body member 110. In other words, no portion of the squeaker member 140 is disposed outside of or extends from an outer surface of the body member 110. For example, in some embodiments, the squeaker member 140 includes an upper or outer surface. The upper or outer surface of the squeaker member 140 is recessed from the outer surface of the body member 110 when the squeaker member 140 is coupled to the body member 110. In some embodiments, when the squeaker member 140 is coupled to the body member 110 such that no portion of the squeaker member 140 extends from the body member, the squeaker member 140 is less likely or prevented from separating from the body member 110.

In some embodiments, squeaker member 140 includes a switch 190. The switch 190 is configured to turn on or off (toggle) the sound producing the capability of the squeaker member 140. For example, in some embodiments, the switch 190 may be placed in first configuration or position to allow the squeaker member 140 to produce sounds or noises. The switch 190 may be placed in a second configuration to prevent or stop the squeaker member 140 from producing sounds or noises.

In some embodiments, the switch 190 is disposed within a lumen defined by the squeaker member 140. The switch 190 is configured to allow air to pass through the lumen when the switch 190 is in a first position or configuration (to allow the squeaker member to produce sounds or noises). The switch is configured to prevent the passage of air through the lumen when the switch 190 is in a second position or configuration (to prevent the squeaker member from producing sounds or noises).

In some embodiments, the sidewall of the body member 110 includes a portion that can be expanded when the body member 110 is collapsed or squeezed and air is not able to exit through the opening defined by the sidewall (for example, when the switch 190 is in its second position preventing air from passing through the lumen of the squeaker member 140). In such embodiments, the body member 110 can still be squeezed or chewed by an animal and the air that would have otherwise exited the cavity will pressure the expandable portion of the sidewall to expand and accept the air. For example, in one embodiment, the sidewall of the body member 110 includes a thin portion that is configured to balloon or expand when pressure from within the cavity of the body member 110 is exerted on the thin portion.

In some embodiments, the sidewall of the body member 110 defines a second opening. The second opening is configured to allow passage from air from the cavity defined by the body member when the air is not able to pass through the first opening (for example, when the switch is in its second position). In such embodiments, the animal may chew on the body member and air will exit the second opening without sounds or noises being produced by the squeaker member 140.

In some embodiments, the squeaker member 140 defines a first lumen and a second lumen. The squeaker member 140 is configured to produce sounds or noises when air passes through the first lumen. The squeaker member 140 is configured to not produce sounds or noises when air passes through the second lumen. In other words, air may pass through the second lumen and the squeaker member 140 will not produce any additional sounds or noises.

FIGS. 2-9 illustrate a device 200 in accordance with an embodiment of the invention. The device 200 includes a body member 210 and a noise producing member or squeaker member 240.

The body member 210 may be of any shape or size. For example, in the illustrated embodiment, the body member 210 is in the form of a sphere or ball. In other embodiments, the body member 210 has a different shape, such as a cube or other shape. In yet other embodiments, the body member 210 has the form of a figure such as a character or an animal.

The body member 210 has a sidewall 212 that defines a cavity 214. The sidewall 212 also defines an opening 216 that is in fluid communication with the cavity 214. The body member 210 may be formed of a flexible or compressible material. Accordingly, the body member 210 may flex or compress when a force is placed on the body member 210. In such embodiments, the body member 210 may be squeezed or chewed on to compress or collapse the body member 210. As the body member 210 compresses or collapses, the cavity 214 defined by the body member 210 will become smaller in volume and the some of the air that was previously disposed within the cavity 214 will be forced out of the opening 216 defined by the sidewall 214 of the body member 210.

In some embodiments, the body member 210 is formed of a material that will return to its original shape or form once the squeezing or compression force is removed from the body member 210. In such embodiments, air will return to the cavity 214 via the opening 216 defined by the sidewall 212 of the body member 210 and the cavity 214 defined by the body member 210 will return to its original size (volume) and shape.

The body member 210 may be formed of any type of material. In some embodiments, the body member 210 is formed of a flexible or compressible material. For example, in some embodiments, the body member 210 is formed of a resilient rubber material, a rubberlike material, a flexible polymer, a synthetic polymer, or vinyl. In some embodiments, the elastic or flexible material (such as a natural or synthetic flexible material) is configured to recover its shape after a deformation (such as after a compression from a squeeze).

The squeaker member 240 is coupled to the body member 210. The squeaker member 240 is a noise generating device. In the illustrated embodiment, the squeaker member 240 is a noise generating device that is configured to generate sounds or noise when air passes by or through the squeaker member 240. The squeaker member 240 defines a lumen 242 that extends from one end portion of the squeaker member 240 to another end portion of the squeaker member 240. The squeaker member 240 is configured to produce sounds or noises when air passes through the lumen 242 defined by the squeaker member 240.

In the illustrated embodiment, the squeaker member 240 includes a reed 244 or other sound producing member disposed within the lumen 242 defined by the squeaker member 240. In some embodiments, the reed 244 is coupled within the lumen 242 defined by the squeaker member 240. For example, in some embodiments, the reed 244 may be coupled to the sidewall that defines the lumen 242 of the squeaker member 242. The reed 244 or other sound producing member will make or generate noise or sounds when air passes through the lumen 242 and by the reed or other sound producing member. For example, in some embodiments, the reed 244 or other sound producing member is configured to vibrate or move when air passes through the lumen 242 to generate a sound or noises. In some embodiments, the reed 244 is formed of a flexible plastic material. In some embodiments, the reed is formed of a flexible or rigid material. In some embodiments, the reed 244 is formed of a natural material. In other embodiments, the reed 244 is formed of a synthetic material. In some embodiments, the reed 244 is several inches in length. In other embodiments the reed 244 is less than 1 inch in length.

Figure 4:
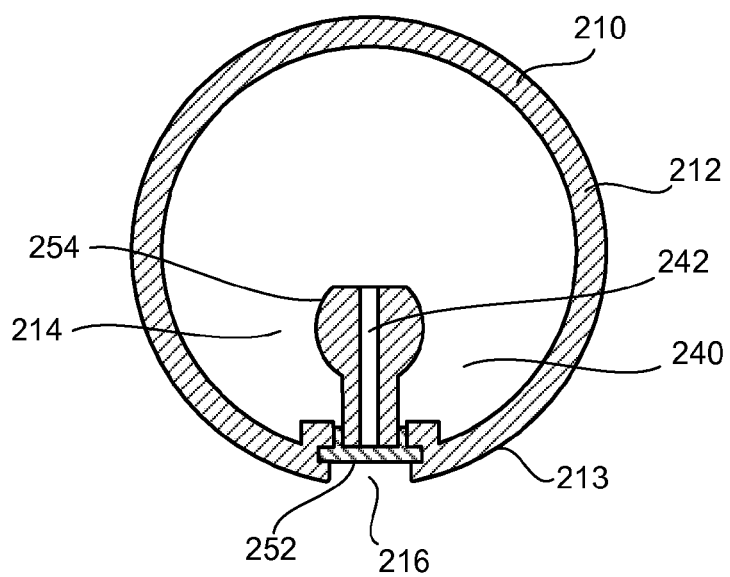
FIG. 4 is a cross-sectional view of the apparatus of FIG. 2.
Figure 5:
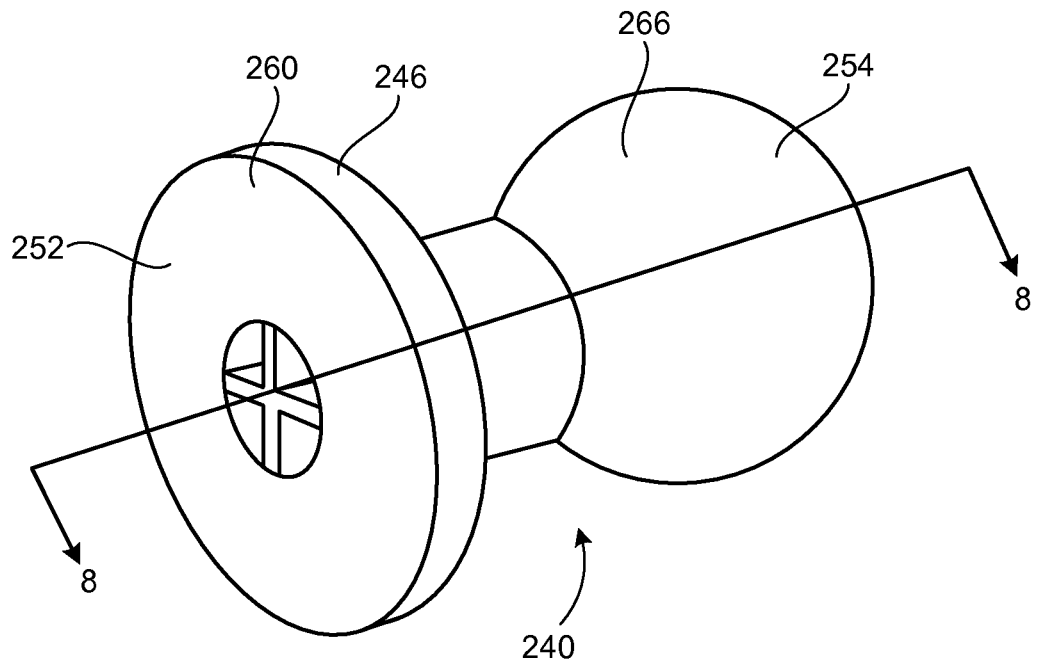
FIG. 5 is a perspective view of the squeaker member of the apparatus of FIG. 2.
Figure 6:
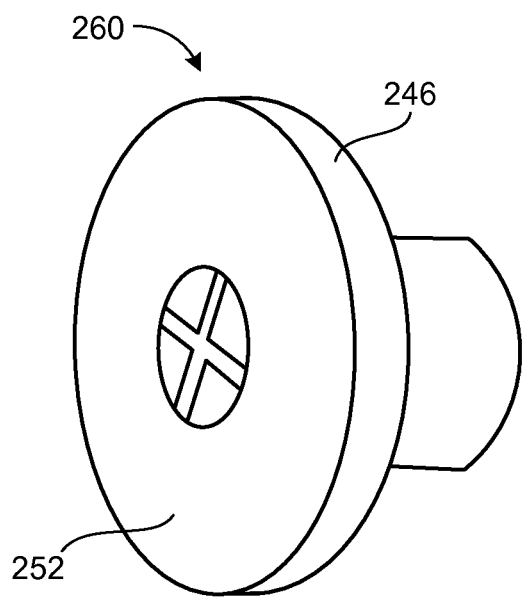
FIG. 6 is a perspective view of a first housing portion of the squeaker member of FIG. 5.
Figure 7:
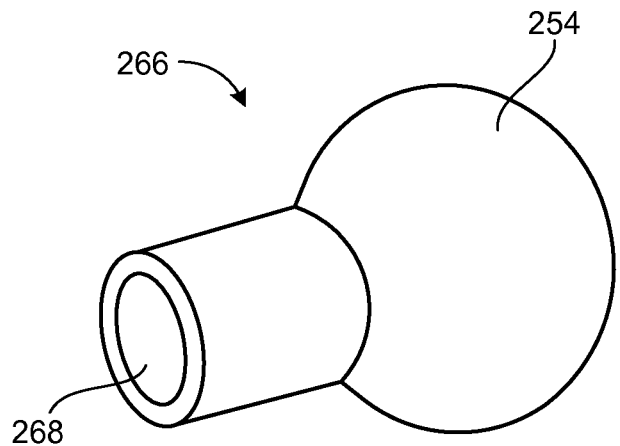
FIG. 7 is a perspective view of a second housing portion of the squeaker member of FIG. 5.

As best illustrated in FIG. 4, the squeaker member 240 is coupled to the body member 210 such that a portion of the squeaker member 240 is disposed within the opening 216 defined by the sidewall 212 of the body member 210. Accordingly, as the body member 210 is compressed or squeezed and air passes through the opening 216 defined by the sidewall 212 of the body member 210, the air will also pass by or through the lumen 242 defined by the squeaker member 240 causing the squeaker member 240 to produce a noise or sound.

In the illustrated embodiment, the squeaker member 240 is coupled to the body member 210 such that a portion of the squeaker member 240 is disposed within a cavity 214 defined by the body member 210. Specifically, the squeaker member 240 is coupled to the body member 210 such that no portion of the squeaker member 240 is disposed outside of the body member 210. In other words, no portion of the squeaker member 240 is disposed outside of or extends from an outer surface 213 of the body member 210. The squeaker member 240 includes an upper or outer surface 252. The upper or outer surface 252 of the squeaker member 240 is recessed from the outer surface 213 of the body member 210 when the squeaker member 240 is coupled to the body member 210. In some embodiments, when the squeaker member 240 is coupled to the body member 210 such that no portion of the squeaker member 240 extends from the body member 210, the squeaker member 240 is less likely to or prevented from separating from the body member 210.

In the illustrated embodiment, the sidewall 212 of the body member 210 defines a channel 218. The channel 218 is disposed adjacent the opening 216 defined by the sidewall 212 and is spaced from the outer surface 213 of the sidewall 212. In the illustrated embodiment, the opening 216 defined by the sidewall 212 is circular and the channel 218 also extends in a circular form. In other embodiments, the opening 216 and the channel may be of shapes other than round or circular. Additionally, in the illustrated embodiment, the channel 218 forms a complete circle about the opening 216 defined by the sidewall 212. In other embodiments, the channel 218 does not form a complete circle. For example, in some embodiments, the channel 218 may be a semicircle or only extend about a portion of the opening 216 defined by the sidewall 212.

The channel 218 is sized, shaped, and configured to receive a portion of the squeaker member 240. For example, in the illustrated embodiment, the channel 218 is configured to receive and extension portion or flange 246 of the squeaker member 240. The extension portion or flange 246 of the squeaker member 240 is larger than the opening 216 defined by the sidewall 212 of the body member 210 and is sized to be received by the channel 218 defined by the sidewall 212. In some embodiments, the fitting of the extension portion or flange 246 of the squeaker member 240 within the channel 218 frictionally couples the squeaker member 240 to the body member 210. In other embodiments, an adhesive or other coupling mechanism is used or also used to couple the squeaker member 240 to the body member 210. In some embodiments, the size of the opening 216 and the size of the reed 244 are relatively small. In other embodiments, the size of the opening 216 and the size of the reed 244 are larger. The different sizes of the components may cause the device 200 to produce sounds or noise of different pitches or tones.

Figure 8:
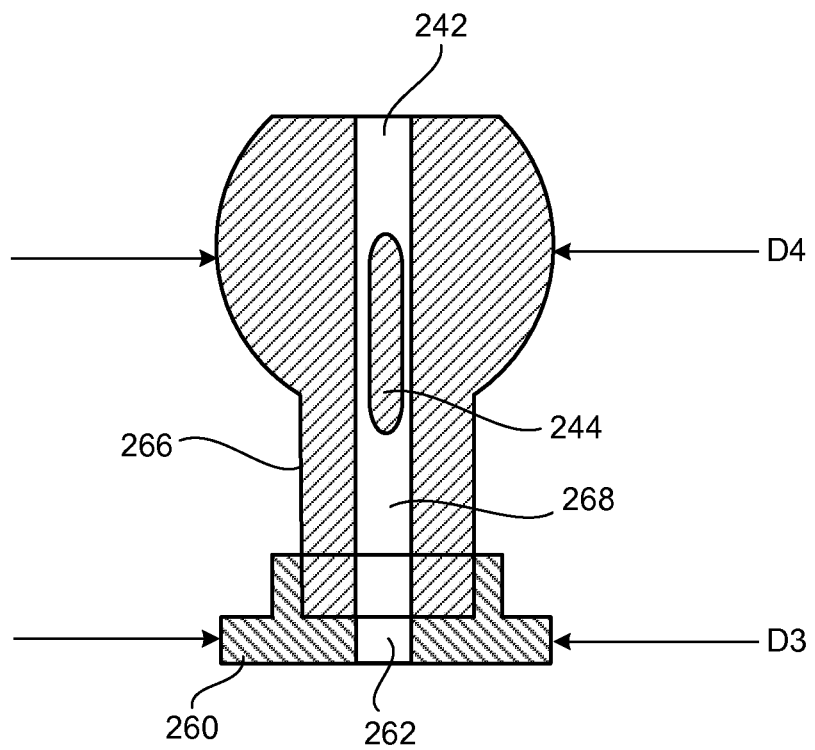
FIG. 8 is a cross-sectional view of the squeaker member of FIG. 5 taken along line 8-8 of FIG. 5.
Figure 9:
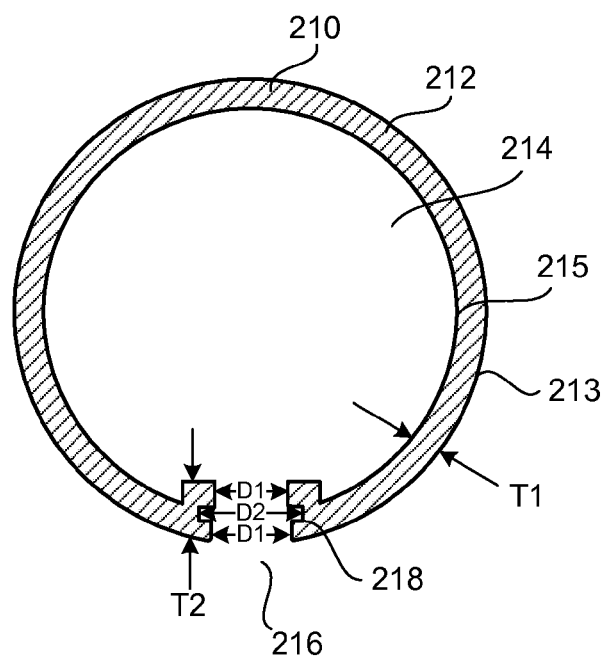
FIG. 9 is a cross-sectional view of a body member of the apparatus of FIG. 1.
Figure 10:
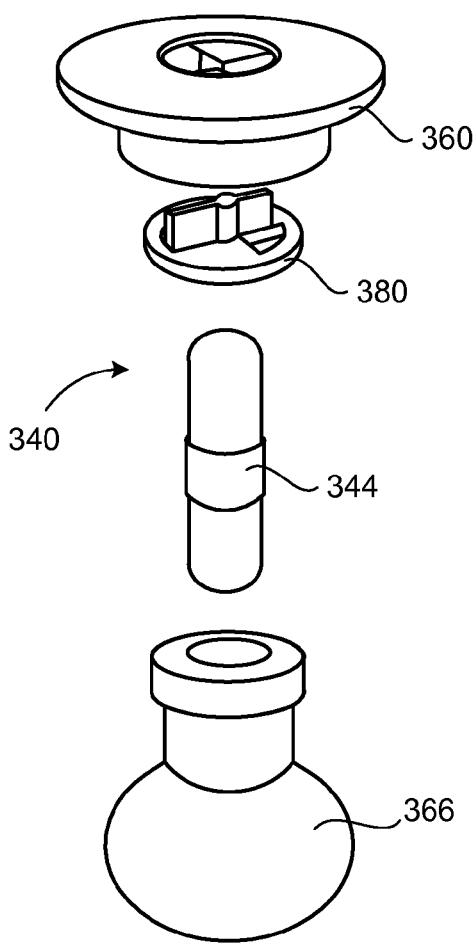
FIG. 10 is an exploded view of a squeaker member according to another embodiment of the invention.

As best illustrated in FIG. 9, the diameter of the opening 216 defined by the sidewall 212 is shown as D1 and the diameter of the channel is shown as D2. As best illustrated in FIG. 8, the diameter of the extension portion or flange is shown as D3.

In the illustrated embodiment, the portion of the squeaker member 240 that is disposed within the cavity 214 defined by the body member 210 includes another extension portion 254 that is larger is size than the opening 216 defined by the sidewall 212 of the body member 210. Accordingly, in some embodiments, the larger extension portion 254 helps prevent the squeaker member 240 from becoming separated from the body member 210. For example, if the extension portion or flange 246 of the squeaker member 240 separates from the channel 218, the extension portion 254 may help prevent the squeaker member 240 from becoming entirely separated from the body portion. In other words, the extension portion 254 would help keep at least a portion of the squeaker member 240 disposed within the cavity 214 of the body member 210. As best illustrated in FIG. 8, the diameter of the extension portion 254 is shown as D4. In some embodiments, the diameter of the extension portion 254 is about the same size as the diameter of the extension portion or flange 246.

In the illustrated embodiment, the extension portion 254 is a bulbous member. In other embodiments, the extension portion 254 has a different shape.

In the illustrated embodiment, the squeaker member 240 includes a first housing member 260 and a second housing member 266. The first housing member 260 includes the extension portion 246 and defines a lumen 262. The second housing member 266 includes the extension portion 254 and defines a lumen 268. The first housing member 260 is coupled to the second housing member 266 such that the lumen 262 of the first housing member 260 is aligned, at least partially, with the lumen 268 defined by the second housing member 266. The lumen 262 of the first housing member 260 and the lumen 268 of the second housing member 266 collectively form the lumen 242 of the squeaker member 240.

In the illustrated embodiment, the first housing member 260 is coupled to the second housing portion 266 such that a portion of the second housing portion 266 is disposed within the lumen 262 or within the first housing member 260. In some embodiments, the first housing member 260 is frictionally coupled to the second housing member 266. In other embodiments, another coupling device, such as an adhesive or heat weld is used to couple, such as fixedly couple, the first housing portion 260 to the second housing portion 266. In the illustrated embodiment, an end portion of the first housing member 260 is coupled to and end portion of the second housing member 266. In some embodiments, the second housing member 266 includes a shoulder or enlarged portion 267. In some embodiments, the shoulder or enlarged portion 267 is configured to facilitate the coupling of the first housing member 260 with the second housing member 266.

As best illustrated in FIG. 9, the sidewall 212 of the body member 210 has a thickness. The thickness is defined as the distance between the outer surface 213 of the sidewall 212 and the inner surface 215 of the sidewall 212. The outer surface 213 is disposed opposite the inner surface 215. In the illustrated embodiment, the sidewall 212 has a first portion that has a first thickness T1 and a second portion that has a second thickness T2 different than the first thickness. In the illustrated embodiment, portion of the sidewall 212 that has the second thickness T2 is disposed adjacent the opening 216 and the channel 218.

FIGS. 10-14 illustrate a squeaker member 340 according to another embodiment of the invention. The squeaker member 340 may be coupled to a body member. The squeaker member 340 is a noise generating device. In the illustrated embodiment, the squeaker member 340 is a noise generating device that is configured to generate sounds or noise when air passes by or through the squeaker member 340. The squeaker member 340 includes a first portion 360 and a second portion 366 and defines a lumen 342 that extends from one end portion of the squeaker member 340 to another end portion of the squeaker member 340. The squeaker member 340 is configured to produce sounds or noises when air passes through the lumen 342 defined by the squeaker member 240.

In the illustrated embodiment, the squeaker member 340 includes a reed 344 or other sound producing member disposed within the lumen 342 defined by the squeaker member 340. In some embodiments, the reed 344 is coupled within the lumen 342 defined by the squeaker member 340. For example, in some embodiments, the reed 344 may be coupled to the sidewall that defines the lumen 342 of the squeaker member 342. The reed 344 or other sound producing member will make or generate noise or sounds when air passes through the lumen 342 and by the reed 344 or other sound producing member. For example, in some embodiments, the reed 344 or other sound producing member is configured to vibrate or move when air passes through the lumen 342 to generate a sound or noises. In some embodiments, the reed 344 is formed of a flexible plastic material In the illustrated embodiment, the squeaker member 340 also includes a switch 380. The switch 380 is configured to place the squeaker member 340 in a first configuration and a second configuration. For example, in the illustrated embodiment, the switch 380 is rotatably coupled to the remainder of the squeaker member 340. In some embodiments the switch 380 is rotatably coupled within the lumen defined by the squeaker member 340. The switch 380 may be rotated with respect to the remainder of the squeaker member 340 from a first position (to place the squeaker member 340 in its first configuration) to a second position (to place the squeaker member 340 in its second configuration).

Figure 11:
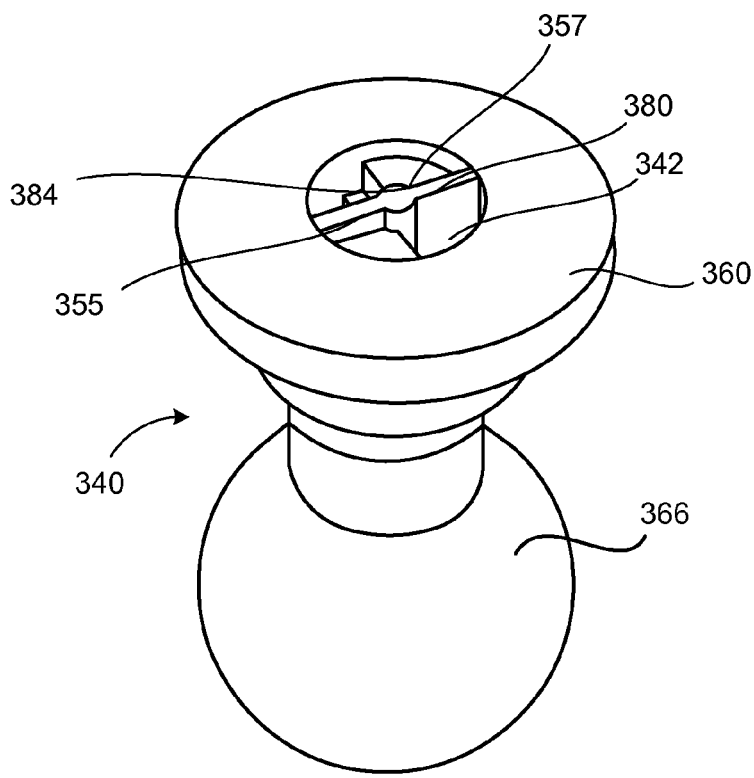
FIG. 11 is a perspective view of the squeaker member of FIG. 10 in a first configuration.
Figure 12:
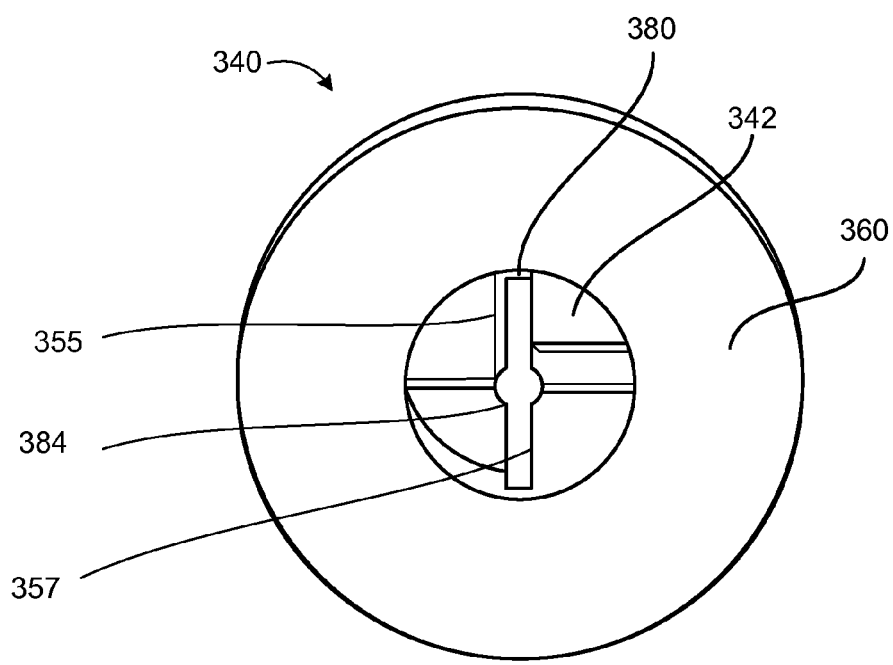
FIG. 12 is an end view of the squeaker member of FIG. 10 in the first configuration.

In the illustrated embodiment, the squeaker member 340 is configured to produce sounds or noises when the squeaker member 340 is in its first configuration and is configured to not produce sounds or noises when the squeaker member 340 is in its second configuration. As best illustrated in FIGS. 11 and 12, when the switch 380 is in its first position and the squeaker member 340 is in its first configuration, the lumen 342 is open and air is free to pass from the cavity of the body member through the lumen 342 in response to a pressure being exerted on the body member. In other words, an opening in the switch 380 is aligned with the lumen 342 to allow air to pass through the lumen 342 and the switch 380. Accordingly, as air passes through the lumen 342, the squeaker member 340 produces sounds or noises.

Figure 13:
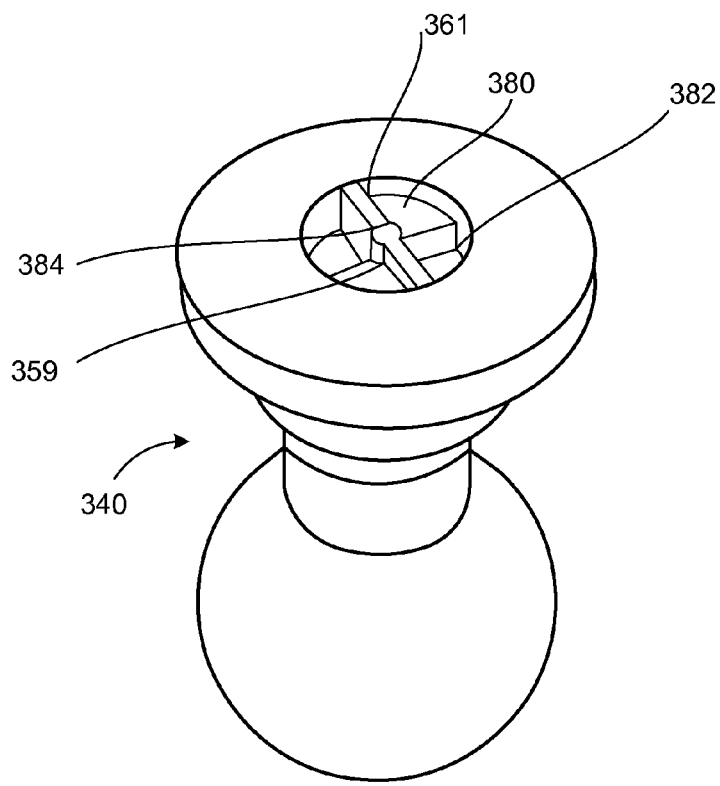
FIG. 13 is a perspective view of the squeaker member of FIG. 10 in a second configuration.
Figure 14:
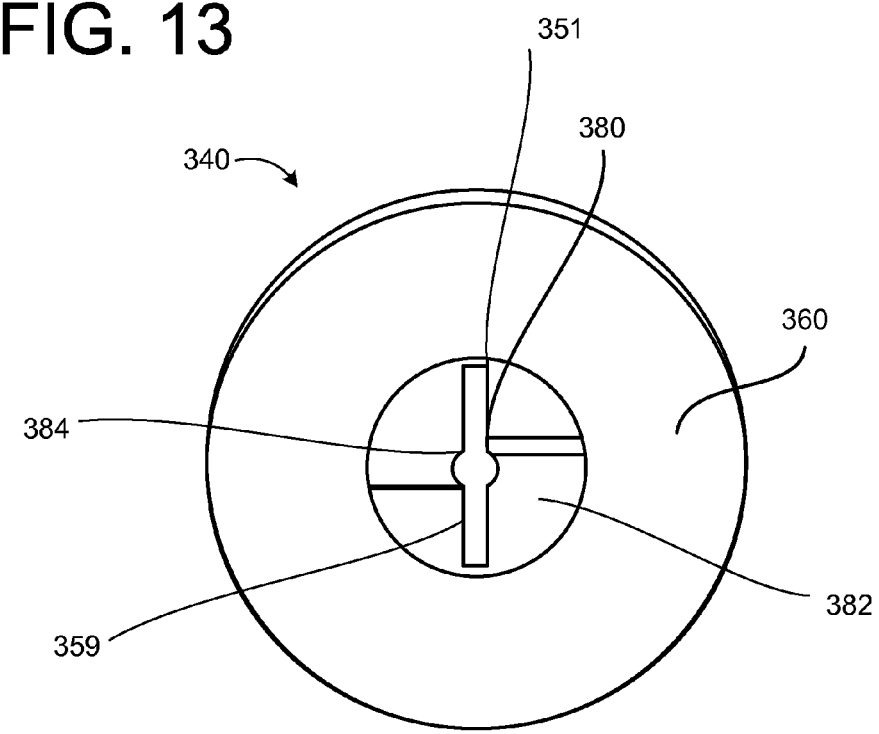
FIG. 14 is an end view of the squeaker member of FIG. 10 in the second configuration.

As best illustrated in FIGS. 13 and 14, when the switch 380 is in its second position and the squeaker member 340 is in its second configuration, the lumen 342 is closed. Specifically, a portion or flap 382 of the switch 380 covers or blocks the lumen 342. In this configuration, air is prevented from passing through the lumen 342 and the squeaker member 340 is prevented from making or generating sounds or noises.

In the illustrated embodiment, the switch 380 includes a handle portion 384 that is configured to be used by a user of the device or apparatus to move or rotate the switch 380 from its first position to its second position or from its second position to its first position. The squeaker member 340 also includes contact portions 355 and 357 that are configured to contact the switch member 380 to prevent over rotation of the switch 380 when the switch is in its first position. The squeaker member 340 also includes contact portions 359 and 361 that are configured to contact the switch member 380 to prevent over rotation of the switch 380 when the switch is in its second position.

In some embodiments, the switch 380 may be configured to be placed in more than two positions with respect to the remainder of the squeaker member 340. For example, in some embodiments, the switch 380 may be configured to be placed in an intermediate position to limit the amount of air that passes through the lumen to limit or reduce the volume of the sounds or noises produced by the squeaker member 340.

Figure 15:
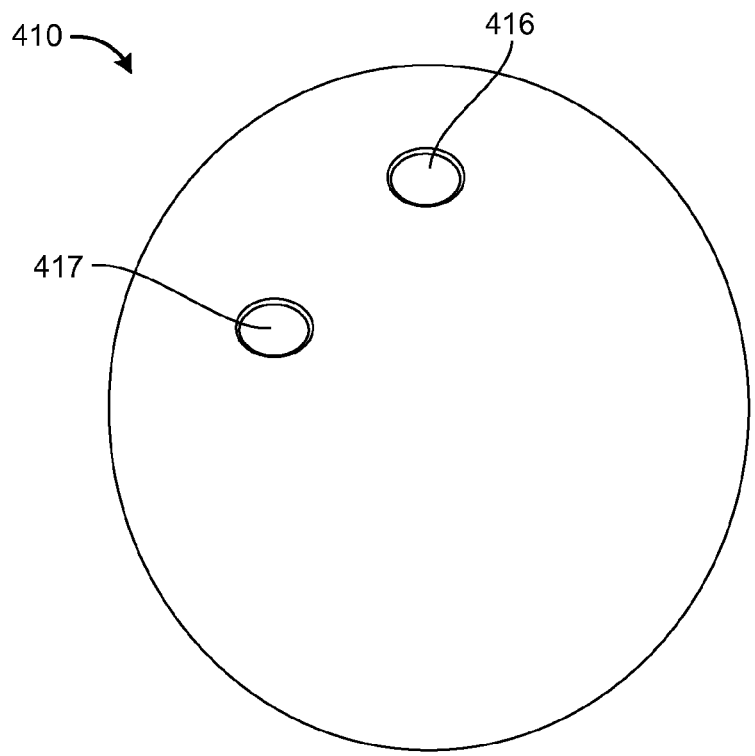
FIG. 15 is a perspective view of a body member of an apparatus according to another embodiment of the invention.
Figure 16:
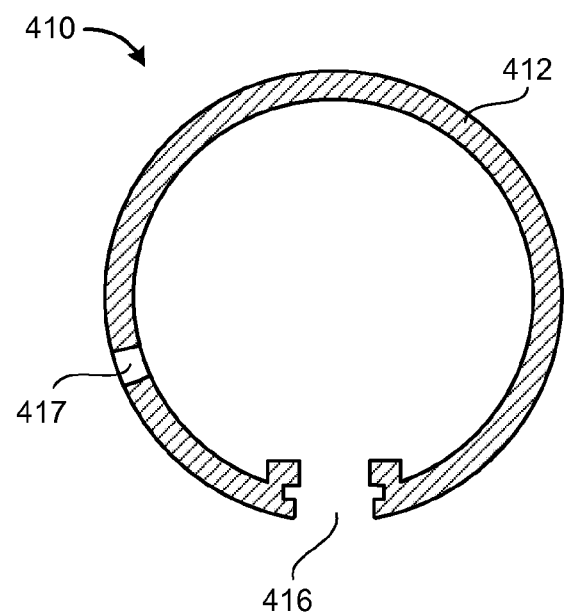
FIG. 16 is a cross-sectional view of the body member of FIG. 15.

FIGS. 15 and 16 illustrate a body member 410 according to another embodiment of the invention. The body member 410 defines a first opening 416 and a second opening 417. The first opening 416 and the second opening 417 provide fluid communication with the cavity defined by the body member 410. In other words, fluid, such as air, that is disposed within the cavity of the body member 410 may exit the cavity of the body member 410 via the openings 416 and 417.

The first opening 416 may be configured to receive and be coupled to a squeaker member. The second opening 417 may be configured to allow air to pass from the cavity defined by the body member 410 through the opening 417. For example, in some embodiments, a squeaker member that includes a switch may be coupled to or within the first opening 416. When the switch is in a position that does not allow air to pass from the cavity of the body member through the lumen of the squeaker member (and through the opening 416), air from within the cavity defined by the body member 410 may pass through the opening 417 in response to a compression force being applied to the body member 410.

In some embodiments, the first opening 416 is larger than the second opening 417. In other embodiments, the second opening 417 is larger than the first opening 416.

Figure 17:
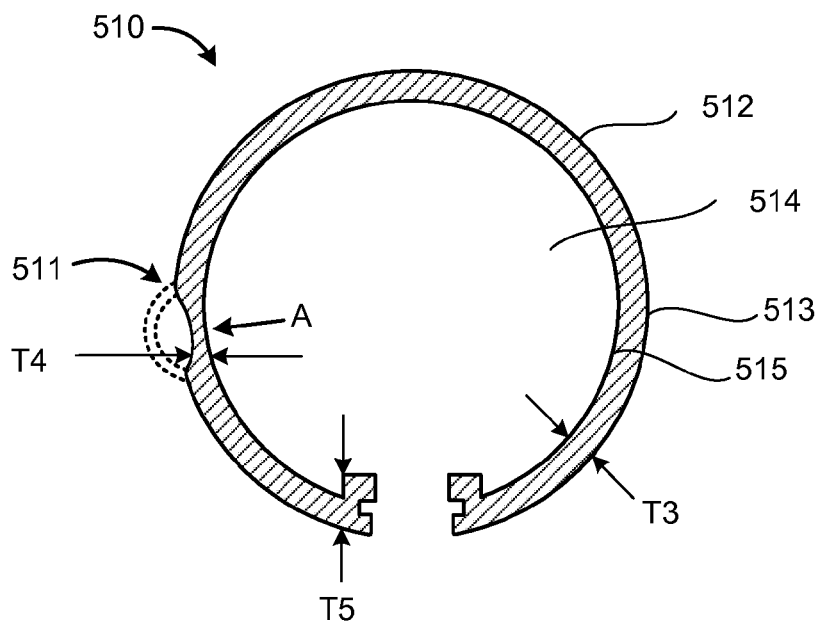
FIG. 17 is a cross-sectional view of a body member of an apparatus according to another embodiment of the invention.

FIG. 17 is a cross-sectional view of a body member 510 according to another embodiment of the invention. The body member 510 includes a sidewall 512 that defines a cavity 514. In the illustrated embodiment, the body member 510 includes a portion 511 that is configured to expand or balloon out (as shown in dashed lines) in response to a pressure being placed on the portion 511 in the direction of arrow A. For example, when a compression force is placed on the body member forces will be placed on the inner surface 515 of the sidewall of the body member 510. This force (in the direction of A) will cause the portion 511 to expand or balloon out.

In the illustrated embodiment, the sidewall has a thickness that is defined as the distance between the inner surface 515 of the sidewall and the outer surface 513 of the sidewall. In the illustrated, illustrated embodiment, the sidewall has varying thickness. Specifically, the sidewall has a first portion that has a thickness of T3 and a second portion 511 that has a thickness of T4. The thickness T4 is less than or smaller than the thickness T3. The thinner portion 511 of the sidewall 512 of the body member 510 is configured to expand or balloon out in response to the force in the direction of the arrow A.

In the illustrated embodiment, the sidewall 512 defines an opening 516. The opening 516 is configured to receive and be coupled to a squeaker member. The sidewall has a thickness T5 near the opening 516. In the illustrated embodiment, the thickness T5 is greater than the thickness T4 and greater than the thickness T3. Additionally, in the illustrated embodiment, the portion 511 of the sidewall 512 that has a thickness T4 is disposed apart from the opening 516.

Figure 18:
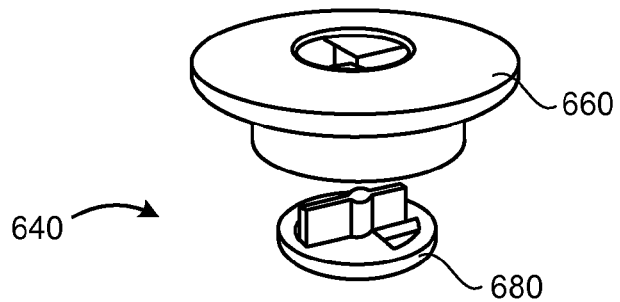
FIG. 18 is an exploded view of a squeaker member according to another embodiment of the invention.
Figure 18:
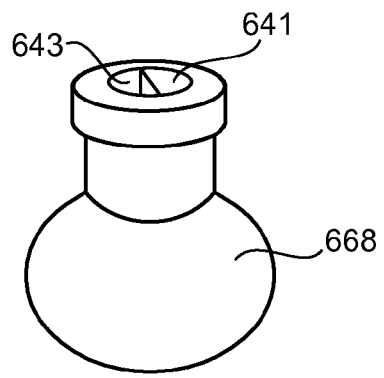
Figure 19:
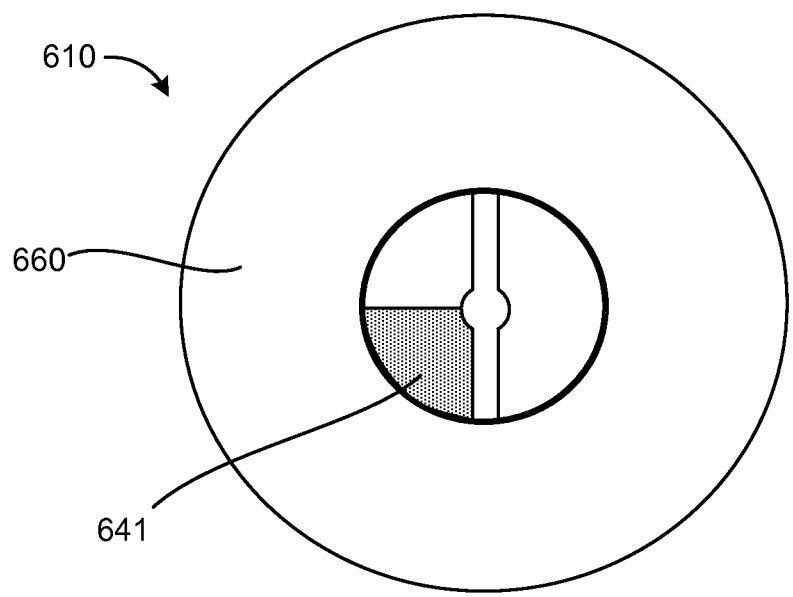
FIG. 19 is an end view of the squeaker member of FIG. 16 in a first configuration.
Figure 20:
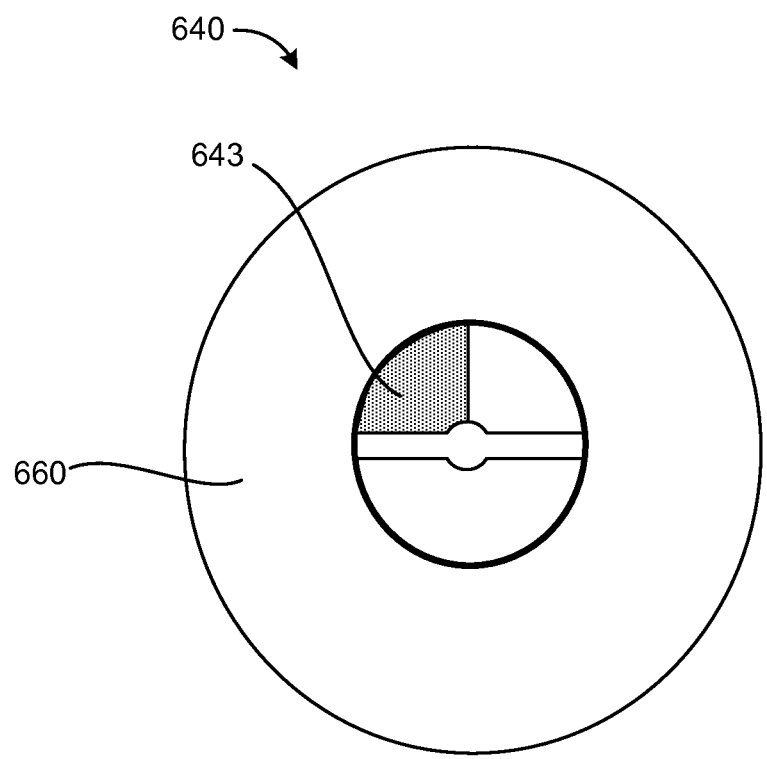
FIG. 20 is an end view of the squeaker member of FIG. 16 in a second configuration.

FIGS. 18-20 illustrate a squeaker member 640 according to another embodiment of the invention. The squeaker member 640 may be coupled to a body member. The squeaker member 640 is a noise generating device. In the illustrated embodiment, the squeaker member 640 is a noise generating device that is configured to generate sounds or noise when air passes by or through the squeaker member 640. The squeaker member 640 defines a first lumen 641 that extends from one end portion of the squeaker member 640 to another end portion of the squeaker member 640 and a second lumen 643 that extends from the one end portion of the squeaker member 640 to the other end portion of the squeaker member 640. The squeaker member 640 is configured to produce sounds or noises when air passes through the first lumen 641 defined by the squeaker member 640.

In the illustrated embodiment, the squeaker member 640 includes a reed 644 or other sound producing member disposed within the first lumen 641 defined by the squeaker member 640. In some embodiments, the reed 644 is coupled within the lumen 641 defined by the squeaker member 640. For example, in some embodiments, the reed 644 may be coupled to the sidewall that defines the first lumen 641 of the squeaker member 640. The reed 644 or other sound producing member will make or generate noise or sounds when air passes through the first lumen 641 and by the reed 644 or other sound producing member. For example, in some embodiments, the reed 644 or other sound producing member is configured to vibrate or move when air passes through the first lumen 641 to generate sound or noises. In some embodiments, the reed 644 is formed of a flexible plastic material In the illustrated embodiment, the squeaker member 640 also includes a switch 680. The switch 680 is configured to place the squeaker member 640 in a first configuration and a second configuration. For example, in the illustrated embodiment, the switch 680 is rotatably coupled to the remainder of the squeaker member 640. The switch 680 may be rotated with respect to the remainder of the squeaker member 640 from a first position (to place the squeaker member 640 in its first configuration) to a second position (to place the squeaker member 640 in its second configuration).

In the illustrated embodiment, the squeaker member 640 is configured to produce sounds or noises when the squeaker member 640 is in its first configuration and is configured to not produce sounds or noises when the squeaker member 640 is in its second configuration. As best illustrated in FIG. 19, when the switch 680 is in its first position and the squeaker member 640 is in its first configuration, the first lumen 641 is open and air is free to pass from the cavity of the body member through the first lumen 641 in response to a pressure being exerted on the body member. Specifically, a portion or flap 682 of the switch 680 covers or blocks the second lumen 643. Accordingly, as air passes through the first lumen 641 (and the reed 644), the squeaker member 640 produces sounds or noises.

As best illustrated in FIG. 20, when the switch 680 is in its second position and the squeaker member 640 is in its second configuration, the first lumen 641 is closed and the second lumen 643 is open. Specifically, a portion or flap 684 of the switch 680 covers or blocks the first lumen 641. In this configuration, air is prevented from passing through the first lumen 641 and the squeaker member 640 is prevented from making or generating sounds or noises. In this configuration, however, air is free to pass from the cavity of the body member through the second lumen 643 in response to a pressure being exerted on the body member. As the second lumen 643 does not house the reed 644, the squeaker member 640 does not produce sounds or noises when air passes through the second lumen 643.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An animal toy, comprising:
   a body member defining a cavity and including a sidewall, the sidewall defining an opening in fluid communication with the cavity, the sidewall having a continuous channel, the opening having a diameter of a first size, the channel having a diameter of a second size, the second size being larger than the first size, the opening having the diameter of the first size at a first portion of the opening, the opening having a diameter of the first size at a second portion of the opening, the channel being disposed between the first portion of the opening and the second portion of the opening; and
   a squeaker member defining a lumen and configured to produce a sound in response to air passing through the lumen, the squeaker member having an extension portion,
   the squeaker member being coupled to the body member such that the extension member is disposed within the channel of the sidewall and at least a portion of the squeaker member is disposed apart from the sidewall and within the cavity defined by the body member, the sidewall includes an inner surface and an outer surface, the extension portion of the squeaker member includes an upper surface, the upper surface of the extension portion being recessed from the outer surface of the sidewall; and
   wherein a portion of the extension portion engages a portion of the sidewall that defines the channel to frictionally couple the squeaker member to the body member.

2. The animal toy of claim 1, wherein the squeaker member includes a first housing portion, a second housing portion, and a noise producing member, the first housing portion being coupled to the second housing portion, the first housing portion and the second housing portion collectively defining the lumen, the noise producing member being disposed within the lumen.

3. The animal toy of claim 1, wherein the squeaker member includes a first housing portion and a second housing portion, the first housing portion defining a lumen, the second housing portion defining a lumen, the first housing portion being fixedly coupled to the second housing portion such that at least a portion of the second housing portion is disposed within the lumen defined by the first housing portion.

4. The animal toy of claim 1, wherein the squeaker member includes a first housing portion and a second housing portion, the first housing portion defining a lumen, the second housing portion defining a lumen, the first housing portion being fixedly coupled to the second housing portion such that at least a portion of the second housing portion is disposed within the lumen defined by the first housing portion, the first housing portion including the extension portion.

5. The animal toy of claim 1, wherein the sidewall includes a first portion and a second portion, the first portion having a first thickness, the second portion having a second thickness greater than the first thickness.

6. The animal toy of claim 1, wherein the sidewall includes a first portion and a second portion, the first portion having a first thickness, the second portion having a second thickness greater than the first thickness, the second portion of the sidewall being disposed adjacent the channel defined by the sidewall.

7. The animal toy of claim 1, wherein the sidewall includes a first portion and a second portion, the first portion having a first thickness, the second portion having a second thickness greater than the first thickness, the second portion of the sidewall defining the channel.

8. The animal toy of claim 1, the extension portion being a first extension portion, wherein the squeaker member includes a first housing portion coupled to a second housing portion, the first housing portion including the first extension portion, the first extension portion having a diameter, the second housing portion having a second extension portion, the second extension portion having a diameter at least as large as the diameter of the first extension portion.

9. The animal toy of claim 1, the squeaker member including a switch, the switch being configured to be moved from a first position to a second position, the switch being configured to prevent the passing of air through the lumen when the switch is in its first position.

10. The animal toy of claim 1, the squeaker member including a switch, the switch being configured to be moved from a first position to a second position, the switch being configured to prevent the passing of air through the lumen when the switch is in its first position, the switch being configured to allow passing of air through the lumen when the switch is in its second position.

11. The animal toy of claim 1, wherein the squeaker member includes a first housing portion and a second housing portion, the first housing portion defining a lumen, the second housing portion defining a lumen, the first housing portion being fixedly coupled to the second housing portion such that only a portion of the second housing portion is disposed within the lumen defined by the first housing portion.

12. The animal toy of claim 1, wherein the squeaker member includes a first housing portion and a second housing portion, the first housing portion defining a lumen, the second housing portion defining a lumen, the second housing portion having a first end and a second end, the first housing portion being fixedly coupled to the second housing portion such that the first end portion of the second housing portion is disposed within the lumen defined by the first housing portion.

13. The animal toy of claim 1, the squeaker member including a switch, the switch being configured to be moved from a first position to a second position, the switch being configured to prevent the passing of air through the lumen when the switch is in its first position, the switch being configured to allow passing of air through the lumen when the switch is in its second position, the squeaker member having a first contact portion and a second contact portion configured to contact the switch when the switch is in its first position.

14. The animal toy of claim 1, the squeaker member including a switch, the switch being configured to be moved from a first position to a second position, the switch being configured to prevent the passing of air through the lumen when the switch is in its first position, the switch being configured to allow passing of air through the lumen when the switch is in its second position, the squeaker member having a first contact portion and a second contact portion configured to contact the switch when the switch is in its first position, the squeaker member having a third contact portion and a fourth contact portion configured to contact the switch when the switch is in its second position.

15. The animal toy of claim 1, wherein the continuous channel forms a complete circle.

16. The animal toy of claim 1, wherein the squeaker member includes a sound producing member disposed within the lumen defined by the squeaker member.

17. The animal toy of claim 1, wherein the squeaker member includes a reed disposed within the lumen defined by the squeaker member.

18. The animal toy of claim 1, wherein a portion of the extension portion directly contacts a portion of the sidewall that defines the channel.

19. The animal toy of claim 1, wherein an adhesive couples a portion of the extension portion to a portion of the sidewall that defines the channel.

20. An animal toy, comprising:
a body member defining a cavity and including a sidewall, the sidewall defining an opening in fluid communication with the cavity, the sidewall having a channel that forms a circle about the opening defined by the sidewall, the opening having a diameter of a first size, the channel having a diameter of a second size, the second size being larger than the first size, the opening having the diameter of the first size at a first portion of the opening, the opening having a diameter of the first size at a second portion of the opening, the channel being disposed between the first portion of the opening and the second portion of the opening; and
a squeaker member defining a lumen and configured to produce a sound in response to air passing through the lumen,
the squeaker member having an extension portion, the squeaker member being coupled to the body member such that the extension member is disposed within the channel of the sidewall and at least a portion of the squeaker member is disposed apart from the sidewall and within the cavity defined by the body member, the sidewall includes an inner surface and an outer surface, the extension portion of the squeaker member includes an upper surface, the upper surface of the extension portion being recessed from the outer surface of the sidewall; and
wherein a portion of the extension portion engages a portion of the sidewall that defines the channel to frictionally couple the squeaker member to the body member.

21. The animal toy of claim 20, wherein the squeaker member includes a first housing portion and a second housing portion, the first housing portion defining a lumen, the second housing portion defining a lumen, the second housing portion having a first end and a second end, the first housing portion being fixedly coupled to the second housing portion such the first end portion of the second housing portion is disposed within the lumen defined by the first housing portion.

22. The animal toy of claim 20, the squeaker member including a switch, the switch being configured to be moved from a first position to a second position, the switch being configured to prevent the passing of air through the lumen when the switch is in its first position, the switch being configured to allow passing of air through the lumen when the switch is in its second position, the squeaker member having a first contact portion and a second contact portion configured to contact the switch when the switch is in its first position.

23. The animal toy of claim 20, the squeaker member including a switch, the switch being configured to be moved from a first position to a second position, the switch being configured to prevent the passing of air through the lumen when the switch is in its first position, the switch being configured to allow passing of air through the lumen when the switch is in its second position, the squeaker member having a first contact portion and a second contact portion configured to contact the switch when the switch is in its first position, the squeaker member having a third contact portion and a fourth contact portion configured to contact the switch when the switch is in its second position.

24. The animal toy of claim 20, wherein the squeaker member includes a sound producing member disposed within the lumen defined by the squeaker member.

25. The animal toy of claim 20, wherein the squeaker member includes a reed disposed within the lumen defined by the squeaker member.

26. The animal toy of claim 19, wherein a portion of the extension portion directly contacts a portion of the sidewall that defines the channel.

27. The animal toy of claim 19, wherein an adhesive couples a portion of the extension portion to a portion of the sidewall that defines the channel.

* * * * *